United States Patent
Coughlan et al.

(10) Patent No.: US 8,923,938 B2
(45) Date of Patent: Dec. 30, 2014

(54) PROTECTIVE CARRYING APPARATUS FOR A CELLULAR PHONE AND ESSENTIAL PERSONAL ITEMS

(71) Applicants: Kelley Elizabeth Coughlan, Santa Monica, CA (US); Jennifer Gennene Deese, Santa Monica, CA (US)

(72) Inventors: Kelley Elizabeth Coughlan, Santa Monica, CA (US); Jennifer Gennene Deese, Santa Monica, CA (US)

(73) Assignee: Pursecase LLC, Santa Monica, CA (US)

( * ) Notice: Subject to any disclaimer, the term of this patent is extended or adjusted under 35 U.S.C. 154(b) by 0 days.

(21) Appl. No.: 14/185,848

(22) Filed: Feb. 20, 2014

(65) Prior Publication Data

US 2014/0235303 A1    Aug. 21, 2014

Related U.S. Application Data

(60) Provisional application No. 61/767,128, filed on Feb. 20, 2013.

(51) Int. Cl.
| | | |
|---|---|---|
| H04M 1/23 | (2006.01) | |
| A45F 5/02 | (2006.01) | |
| A45C 15/00 | (2006.01) | |
| H04B 1/38 | (2006.01) | |
| H04M 1/04 | (2006.01) | |

(52) U.S. Cl.
CPC . *A45F 5/02* (2013.01); *A45C 15/00* (2013.01); *H04B 1/38* (2013.01); *H04M 1/04* (2013.01)

USPC .......................................... 455/575.8

(58) Field of Classification Search
USPC .............................. 455/575.1, 575.8; 206/576
See application file for complete search history.

(56) References Cited

U.S. PATENT DOCUMENTS

| | | | |
|---|---|---|---|
| 8,418,852 B2 * | 4/2013 | Ziemba ......................... 206/235 |
| 2009/0045091 A1 * | 2/2009 | O'Neill et al. ................ 206/449 |
| 2012/0244918 A1 * | 9/2012 | Hall ............................ 455/575.4 |
| 2013/0157730 A1 * | 6/2013 | McCormac et al. ....... 455/575.8 |
| 2014/0066142 A1 * | 3/2014 | Gipson ..................... 455/575.8 |
| 2014/0144796 A1 * | 5/2014 | Ziemba ......................... 206/235 |
| 2014/0148228 A1 * | 5/2014 | Altschul et al. ............ 455/575.8 |
| 2014/0228082 A1 * | 8/2014 | Morrow et al. ............ 455/575.8 |
| 2014/0251368 A1 * | 9/2014 | Lawson et al. ................ 132/287 |

* cited by examiner

*Primary Examiner* — Blane J Jackson

(57) ABSTRACT

A protective carrying apparatus is designed to protect a cellular phone from any physical damage and to hold essential personal items such as coin or paper currency, credit or debit cards, and identification cards. The apparatus is configured to resemble a handbag or purse. The apparatus includes a formfitting phone case, a wallet, a handle, and a mirror. The formfitting phone case is used to enclose the cellular phone and has holes that allow a user to access the cellular phone's controls. The wallet is integrated onto one side of the formfitting phone case and is used to store the user's essential personal items. The mirror is mounted within the wallet but is readily available to the user. The handle is connected adjacent to the formfitting phone case so that the user can carry the apparatus and can properly orient the apparatus while operating the cellular phone.

19 Claims, 7 Drawing Sheets

PROTECTIVE CARRYING APPARATUS FOR A CELLULAR PHONE AND ESSENTIAL PERSONAL ITEMS

The current application claims a priority to the U.S. Provisional Patent application Ser. No. 61/767,128 filed on Feb. 20, 2013.

FIELD OF THE INVENTION

The present invention relates generally to cell phone cases and card holders. More specifically, the present invention is a combination cell phone and card holding case which combines the functionality of both a cell phone case and a card holding case into one apparatus which has a physical appearance that is similar to a small handbag known as a purse.

BACKGROUND OF THE INVENTION

In the modern world, mobile devices such as cell phones and tablet computers have become an integral part of society. A huge portion of the population of developed countries such as the United States posses a mobile computing device of some kind, be it a cell phone, a smart phone, or a tablet computer. All of these mobile computing devices are designed to be carried by a user wherever the user goes. As a result of this fact, the mobile computing device is subjected to a number of hostile environments and conditions which could easily cause damage to the mobile computing device if it is unshielded. In response to this fact, a wide range of different cases have been developed to armor mobile computing devices against potential damage that would be otherwise incurred during daily use. Such mobile computing device cases also serve as a way for the user to accessorize, or customize their appearance by selecting a case that has a specific color or design. This adds an aesthetic function to the already existing physical functions of mobile computing device cases.

Another unrelated item which serves aesthetic as well as physical functions is a purse. A purse is a small handbag most often carried by women. Purses serve as the primary method of currency storage for women as well as serving to store small personal items. There are different forms of currency which can be stored within a purse, including paper currency, checks, and credit and debit cards. Credit and Debit cards are a very common method of paying for items, and as such, many purses posses specialized compartments for storing these cards such that they are easy to access and do not become lost. The purse provides not only a convenient method of storing items, but also a way for a user to further customize their appearance by choosing a purse that possesses specific characteristics. Most purses comprise at least one storage volume enclosed by some material and connected to a handle or shoulder strap such that it can be easily carried by the user; however the color, pattern, size, and general shape of any given purse can vary greatly.

There are also small devices available on the market, and such devices are designed purely for the storage of cards and nothing else. These small devices provide a convenient place for the user to store all their credit, debit, and even identification cards such that they are not lost and they are all stored in one place. All of the objects described above serve to solve specific problems of the modern world, and they each do so quite well. However, there is no object or device which incorporates elements of all three devices into one. It is an object of the present invention to combine functionality of a mobile computing device case, a purse, and a card holder into one device. The present invention combines the protective capabilities of the mobile computing device case, the aesthetic appeal of the purse, and the card storage capabilities of the card holder into one apparatus. The present invention simultaneously protects the mobile computing device, possesses the aesthetic appeal and ease of handling of a purse, and stores credit and debit cards so they are easily accessible and not lost.

DETAILED DESCRIPTIONS OF THE INVENTION

All illustrations of the drawings are for the purpose of describing selected versions of the present invention and are not intended to limit the scope of the present invention.

Figure 5:
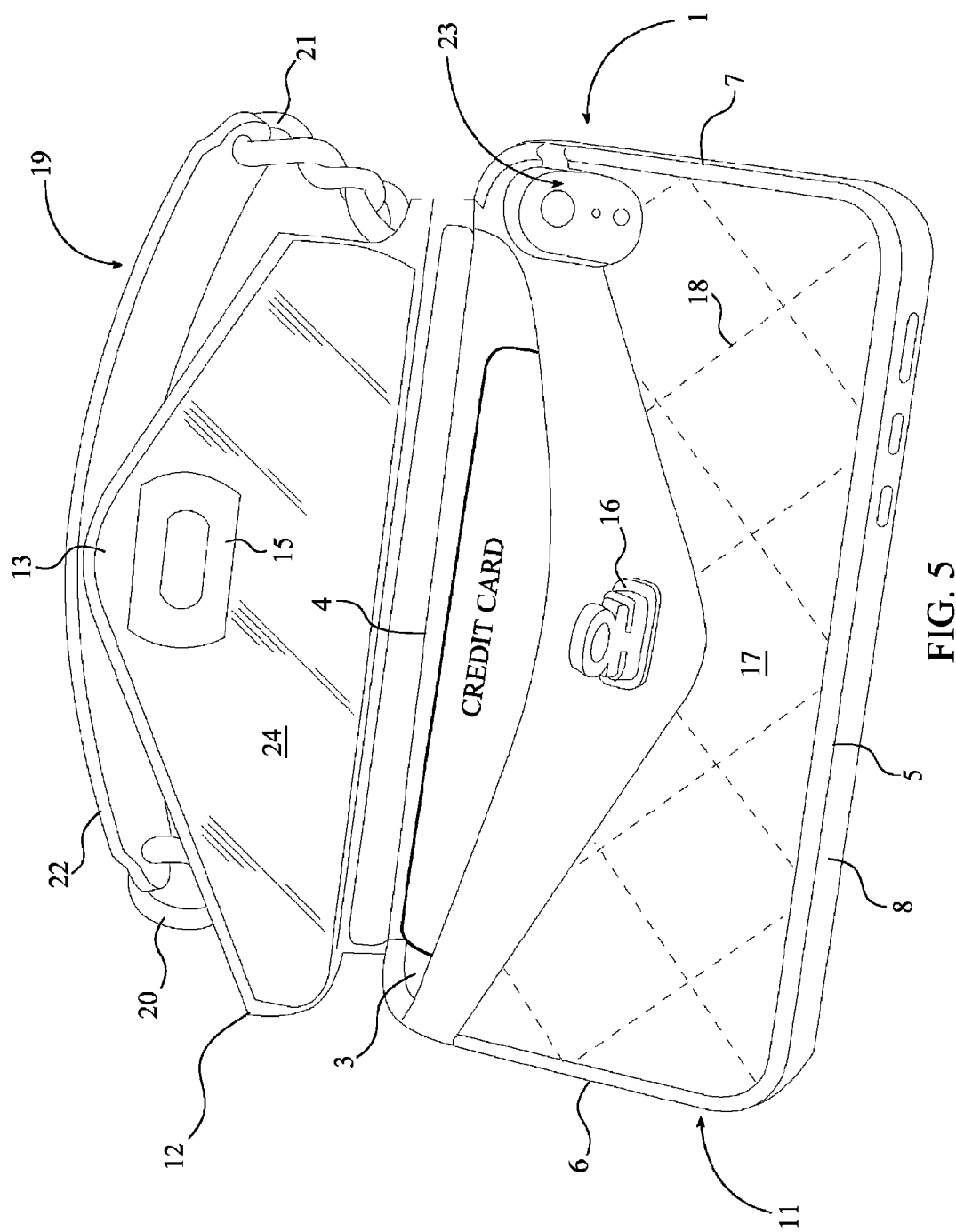
FIG. 5 is a perspective view of the present invention with its wallet in an open position.
Figure 6:
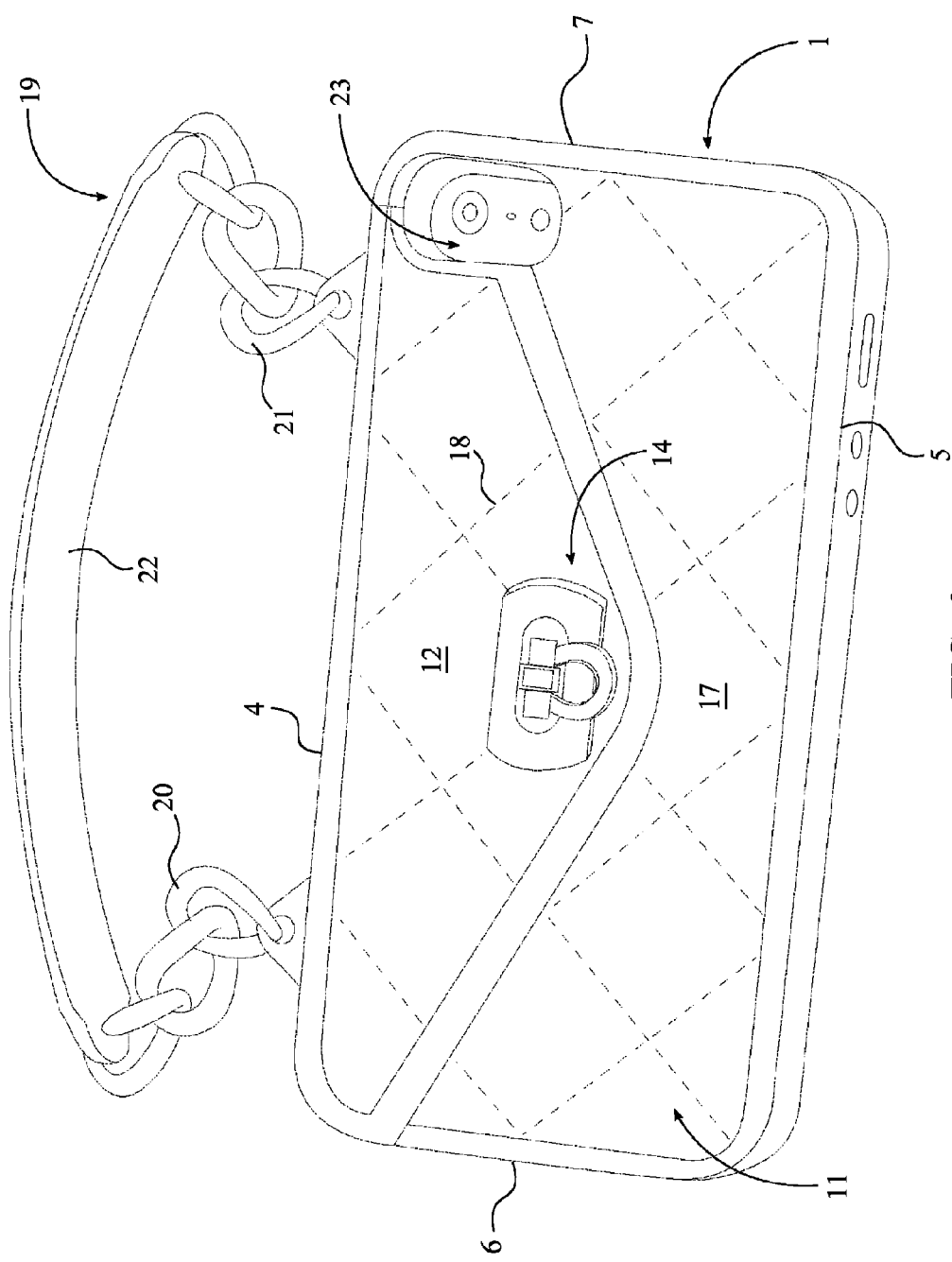
FIG. 6 is a perspective view of the present invention with its wallet in a closed position.
Figure 7:
FIG. 7 is a perspective view of the present invention being carried by a user like a handbag or purse.

As can be seen in FIG. 8, the present invention is a protective carrying apparatus for a cellular phone and essential personal items such as paper or coin currency, credit cards, debit cards, and identification cards. The present invention allows a user to carry their cellular phone and their personal items instead a large handbag or purse, which prevents the user from losing these items within a large handbag or purse. The present invention comprises a formfitting phone case 1, a wallet 11, a handle 19, and a mirror 24, which are shown in FIGS. 5 and 6. The formfitting phone case 1 is used to enclose and protect a cellular phone from any physical damage. The formfitting phone case 1 comprises a first planar portion 2, a second planar portion 3, a lateral portion 8, and a primary-access hole 9. The first planar portion 2 and the second planar portion 3 are used to cover the two opposing flat sides of a cellular phone, and the lateral portion 8 is user to cover the sides of the cellular phone. The primary-access hole 9 traverses through the first planar portion 2 and allows the user to access the main control panel for a cellular phone. In the preferred embodiment of the present invention, the primary-access hole 9 allows a user to access the touchscreen of a smart phone, and, thus, the primary-access hole 9 is sized to circumscribe the touchscreen. The wallet 11 is integrated into the second planar portion 3 and is used to hold the essential personal items. The handle 19 is connected adjacent to the lateral portion 8 and allows the user to easily grasp and hold the present invention with their hand. The mirror 24 is mounted within the wallet 11 and provides the user with a convenient means to glaze upon their reflection.

In preferred embodiment of the present invention, the formfitting phone case 1 has a specific geometric configuration illustrated in FIG. 1 through 4, which allows the formfitting phone case 1 to better fit the external shape of a cellular phone. The first planar portion 2 is positioned adjacent and perpendicular to the lateral portion 8, which allows the first planar portion 2 to perimetrically connect to the lateral portion 8. The second planar portion 3 is positioned adjacent and perpendicular to the lateral portion 8 but opposite to the first planar portion 2, which allows the second planar portion 3 to perimetrically connect to the lateral portion 8. This configuration forms a rectangular-shaped enclosure so that the formfitting phone case 1 can better cover the rectangular-bar shape of typical cellular phones.

As can be seen in FIGS. 5 and 6, the wallet 11 allows the present invention to carry essential personal items but is primarily designed to flat objects such as paper or coin currency, credit cards, debit cards, and identification cards. The wallet 11 comprises a foldable flap 12, a quick release fastener 14, and a pocket panel 17. The pocket panel 17 is a piece of material that is connected along the left edge 6, the bottom edge 5, and the right edge 7 of the second planar portion 3, which creates the pocket of the wallet 11. Although the personal items are fairly well held in place by friction and the pressure between the first planar portion 2 and the pocket panel 17, the foldable flap 12 is still necessary because the foldable flap 12 closes off the pocket opening of the wallet 11 so that the contents of the wallet 11 do not fall out of the present invention. The foldable flap 12 is hingedly connected along the top edge 4 of the second planar portion 3 so that the foldable flap 12 can readily close off the pocket opening of the wallet 11. In addition, the foldable flap 12 can be attached to pocket panel 17 by the quick release fastener 14 in order to secure the foldable flap 12 in place. The quick release fastener 14 can be, but is not limited to, a button and a button hole, a clasp, magnets, a snap fastener, or a hook-and-loop fastener.

More specifically, the foldable flap 12 comprises a tapered end 13 that is positioned opposite to the top edge 4 of the second planar portion 3 across the foldable flap 12. The tapered end 13 allows the user to more easily grasp the foldable flap 12 while opening or closing the wallet 11. Moreover, the quick release fastener 14 comprises a first locking component 15 and a second locking component 16, which are two separate physical components that can quickly engage or quickly disengage from each other. For example, the first locking component 15 could be a button hole, and the second locking component 16 could be a button. The first locking component 15 is integrated into the tapered end 13, which allows the quick release fastener 14 to attach the foldable flap 12. In addition, the second locking component 16 is integrated into the pocket panel 17, which allows the quick release fastener 14 to attach to the pocket panel 17. In order to align the first locking component 15 and the second locking component 16 with each other, the second locking component 16 is positioned opposite the bottom edge 5 of the second planar portion 3 across the pocket panel 17. In addition, the mirror 24 is internally connected across the foldable flap 12 so that the user can see the mirror 24 as the foldable flap 12 is pulled up to open the wallet 11. Furthermore, an embroidery pattern 18 is externally positioned across both the foldable flap 12 and the pocket panel 17 so that present invention has a more handbag-like or purse-like appearance. In the preferred embodiment of the present invention, the embroidery pattern 18 is a quilt stitching.

Figure 1:
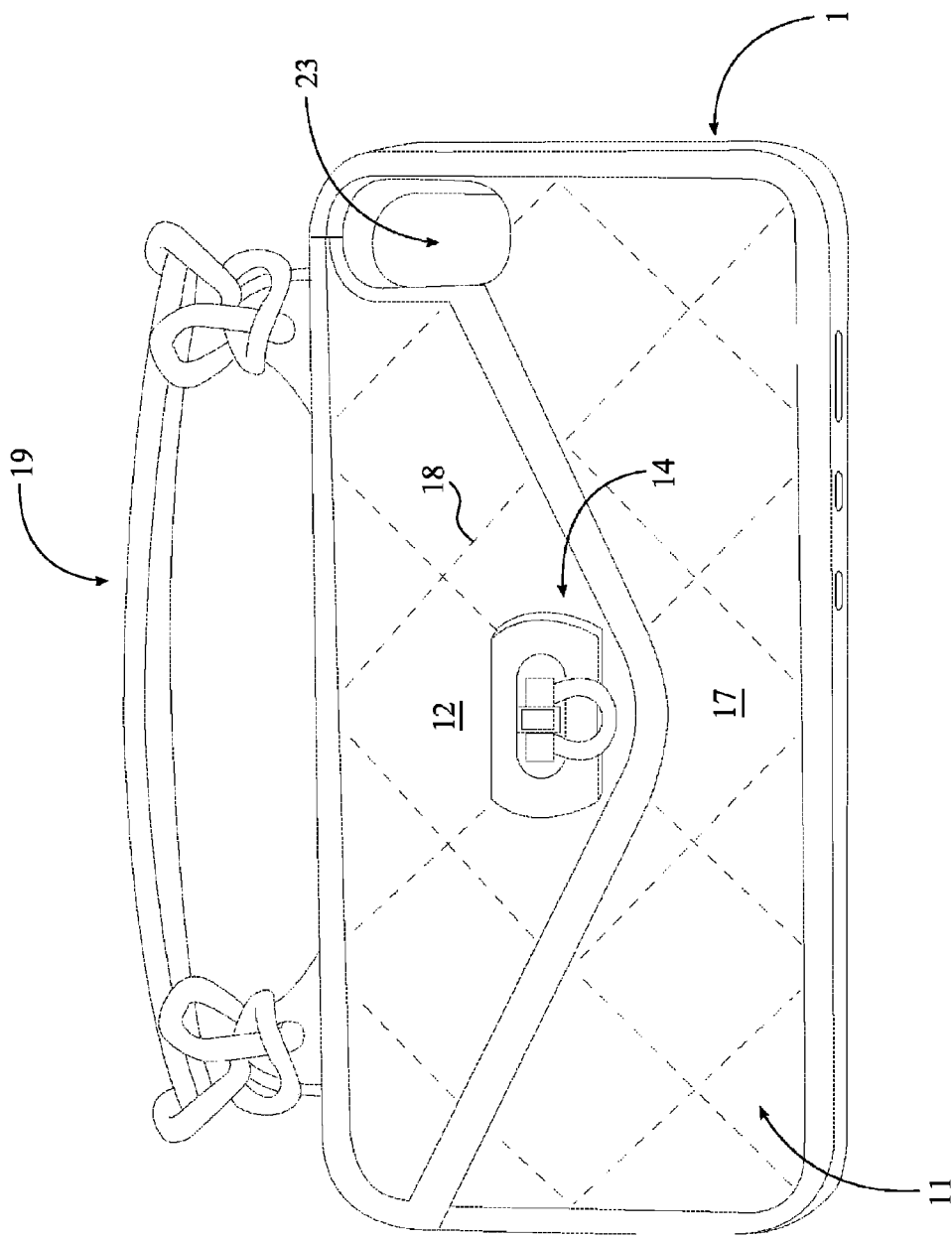
FIG. 1 is a front view of the present invention with its handle in a retracted configuration.
Figure 2:
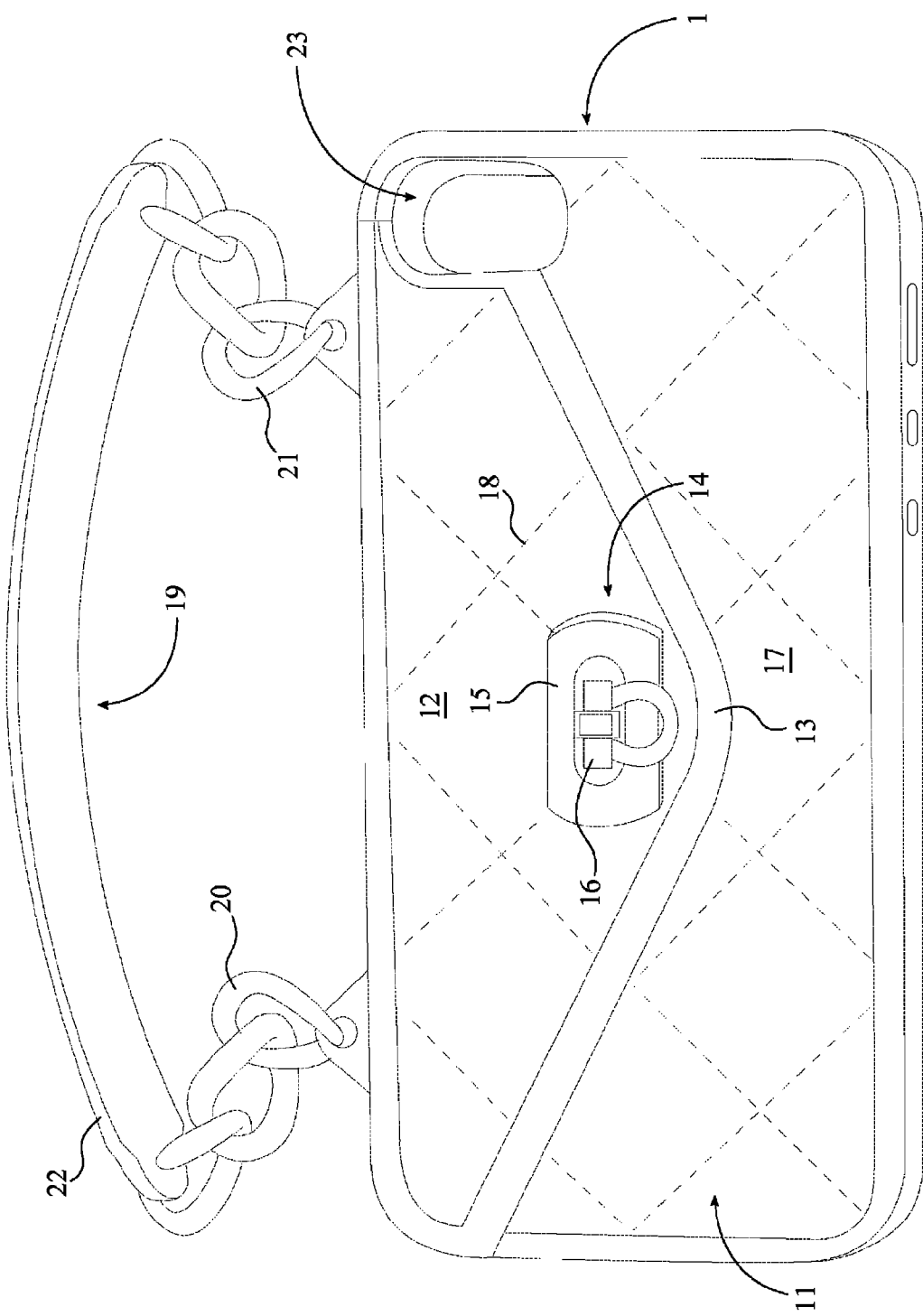
FIG. 2 is a front view of the present invention with its handle in an extended configuration.
Figure 3:
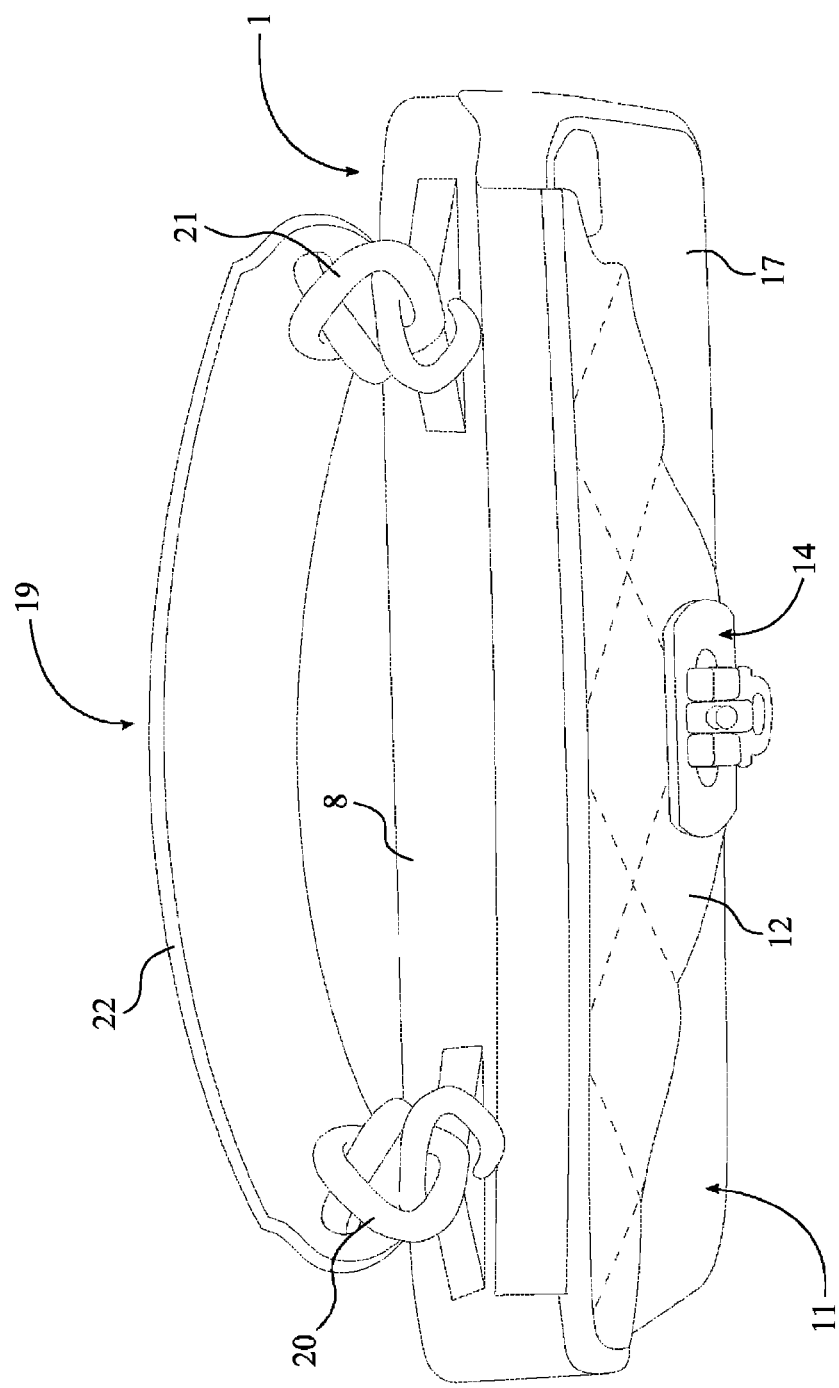
FIG. 3 is a slight-perspective top view of the present invention.
Figure 4:
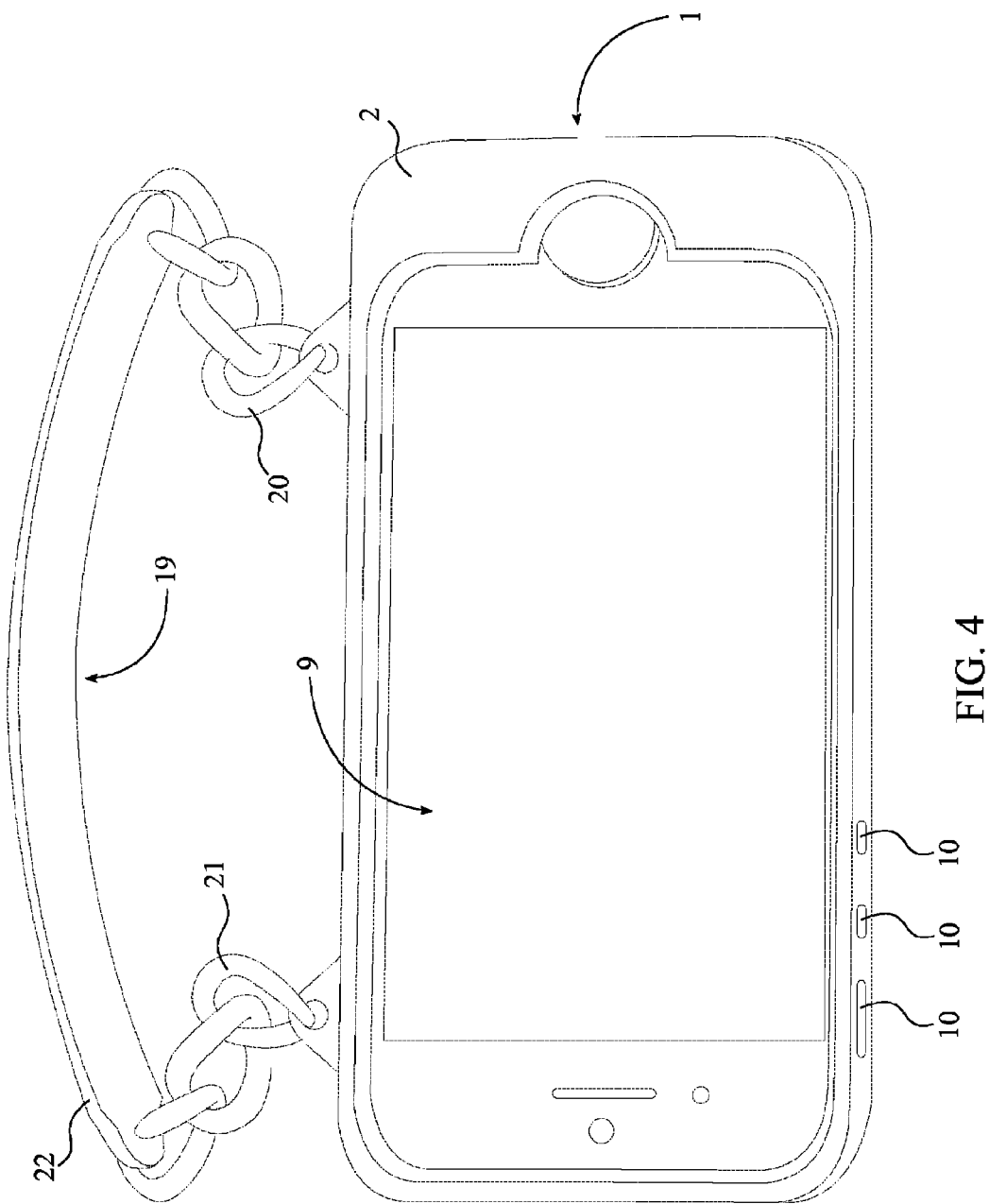
FIG. 4 is a back view of the present invention.

As can be seen in FIGS. 1 and 2, the handle 19 allows the present invention to be held like a typical handbag or purse. The handle 19 comprises a first chain 20, a second chain 21, and a grasping member 22. The grasping member 22 is a flexible yet sturdy band that braces the palm of the user's hand as the user carries the present invention or braces the back of user's hand as the user is operating their cellular phone contained within the present invention. The first chain 20 and the second chain 21 are used to tether the grasping member 22 to the lateral portion 8 and are positioned opposite of each other along the grasping member 22. This allows the user to rotate the handle 19 about their hand so that the user can switch between carrying and operating their cellular phone within the present invention. Moreover, the first chain 20 and the second chain 21 are positioned adjacent to the foldable flap 12, which prevents the first chain 20 the second chain 21 from impeding the movement of the foldable flap 12 and creates a handbag-like or purse-like appearance for the present invention.

As can be seen in FIG. 1 through 4, the present invention allows other parts of a user's cellular phone to be accessed through the formfitting phone case 1. The formfitting phone case 1 further comprises a plurality of secondary-access holes 10, which allows the user to access the ancillary buttons and ports of their cellular phone. In the preferred embodiment of the present invention, the plurality of secondary-access holes 10 traverses through the lateral portion 8 because the ancillary buttons and ports of a typical smart-phone are located on its sides. In addition, the present invention further comprises a camera hole 23, which prevents the present invention from blocking the view of a cellular phone's integrated camera. In the preferred embodiment, the camera hole 23 traverses through the wallet 11 and the second planar portion 3 because the camera is located on the opposite side of the touchscreen for a typical smart-phone.

It is important to note that while the preferred embodiment of the present invention as seen in the figures is designed to be used with a specific model of cell phone, the present invention may be easily adapted to suit other mobile devices of different sizes and models. The present invention may be modified to be compatible with other models of cell phones, smart phones, and even tablet computers. The cell phone case may be manufactured out of a wide range of materials including, but not limited to, plastic, rubber, and fabrics. The choice of material may vary based upon the desired appearance and protective capabilities of the present invention.

Although the invention has been explained in relation to its preferred embodiment, it is to be understood that many other possible modifications and variations can be made without departing from the spirit and scope of the invention as hereinafter claimed.

What is claimed is:

1. A protective carrying apparatus for a cellular phone and essential personal items comprises:
 a formfitting phone case;
 a wallet;
 a handle;
 a mirror;
 said formfitting phone case comprises a first planar portion, a second planar portion, a lateral portion, and a primary-access hole;
 said primary-access hole traversing through said first planar portion;
 said wallet being integrated onto said second planar portion;
 said handle being connected adjacent to said lateral portion;
 said mirror being mounted within said wallet;
 a camera hole; and
 said camera hole traversing through said wallet and said second planar portion.

2. The protective carrying apparatus for a cellular phone and essential personal items as claimed in claim 1 comprises:
 said first planar portion being positioned adjacent and perpendicular to said lateral portion;
 said first planar portion being perimetrically connected to said lateral portion;

said second planar portion being positioned adjacent and perpendicular to said lateral portion, opposite to said first planar portion; and said second planar portion being perimetrically connected to said lateral portion.

3. The protective carrying apparatus for a cellular phone and essential personal items as claimed in claim 1 comprises:

said second planar portion comprises a top edge, a bottom edge, a left edge, and a right edge;

said wallet comprises a foldable flap, a quick release fastener, and an pocket panel;

said pocket panel being connected along said left edge, said bottom edge, and said right edge;

said foldable flap being hingedly connected to said top edge; and said foldable flap being detachably attached to said pocket panel by said quick release fastener.

4. The protective carrying apparatus for a cellular phone and essential personal items as claimed in claim 3 comprises:

said foldable flap comprises a tapered end;

said quick release fastener comprises a first locking component and a second locking component;

said tapered end being positioned opposite to said top edge across said foldable flap;

said first locking component being integrated into said tapered end;

said second locking component being positioned opposite to said bottom edge across said pocket panel; and said second locking component being integrated into said pocket panel.

5. The protective carrying apparatus for a cellular phone and essential personal items as claimed in claim 3 comprises:

said mirror being internally connected across said foldable flap.

6. The protective carrying apparatus for a cellular phone and essential personal items as claimed in claim 3 comprises:

a embroidery pattern; and said embroidery pattern being externally positioned across both said foldable flap and said pocket panel.

7. The protective carrying apparatus for a cellular phone and essential personal items as claimed in claim 1 comprises:

said handle comprises a first chain, a second chain, and a grasping member;

said grasping member being tethered to said lateral portion by said first chain;

said grasping member being tethered to said lateral portion by said second chain; and said first chain and said second chain being positioned opposite of each other along said grasping member.

8. The protective carrying apparatus for a cellular phone and essential personal items as claimed in claim 7 comprises:

said first chain and said second chain being positioned adjacent to a foldable flap of said wallet.

9. The protective carrying apparatus for a cellular phone and essential personal items as claimed in claim 1 comprises:

said formfitting phone case further comprises a plurality of secondary-access holes; and said plurality of secondary-access holes traversing through said lateral portion.

10. A protective carrying apparatus for a cellular phone and essential personal items comprises:

a formfitting phone case;
a wallet;
a handle;
a mirror;

said formfitting phone case comprises a first planar portion, a second planar portion, a lateral portion, and a primary-access hole;

said wallet comprises a foldable flap, a quick release fastener, and an pocket panel;

said second planar portion comprises a top edge, a bottom edge, a left edge, and a right edge;

said primary-access hole traversing through said first planar portion;

said wallet being integrated onto said second planar portion;

said handle being connected adjacent to said lateral portion;

said mirror being mounted within said wallet;

said pocket panel being connected along said left edge, said bottom edge, and said right edge;

said foldable flap being hingedly connected to said top edge; and said foldable flap being detachably attached to said pocket panel by said quick release fastener.

11. The protective carrying apparatus for a cellular phone and essential personal items as claimed in claim 10 comprises:

said first planar portion being positioned adjacent and perpendicular to said lateral portion;

said first planar portion being perimetrically connected to said lateral portion;

said second planar portion being positioned adjacent and perpendicular to said lateral portion, opposite to said first planar portion;

said second planar portion being perimetrically connected to said lateral portion;

said foldable flap comprises a tapered end;

said quick release fastener comprises a first locking component and a second locking component;

said tapered end being positioned opposite to said top edge across said foldable flap;

said first locking component being integrated into said tapered end;

said second locking component being positioned opposite to said bottom edge across said pocket panel; and said second locking component being integrated into said pocket panel.

12. The protective carrying apparatus for a cellular phone and essential personal items as claimed in claim 10 comprises:

a embroidery pattern;

said mirror being internally connected across said foldable flap; and said embroidery pattern being externally positioned across both said foldable flap and said pocket panel.

13. The protective carrying apparatus for a cellular phone and essential personal items as claimed in claim 10 comprises:

said handle comprises a first chain, a second chain, and a grasping member;

said grasping member being tethered to said lateral portion by said first chain;

said grasping member being tethered to said lateral portion by said second chain;

said first chain and said second chain being positioned opposite of each other along said grasping member; and said first chain and said second chain being positioned adjacent to said foldable flap of said wallet.

14. The protective carrying apparatus for a cellular phone and essential personal items as claimed in claim 10 comprises:

a camera hole;
said formfitting phone case further comprises a plurality of secondary-access holes;
said camera hole traversing through said wallet and said second planar portion; and
said plurality of secondary-access holes traversing through said lateral portion.

15. A protective carrying apparatus for a cellular phone and essential personal items comprises:
    a formfitting phone case;
    a wallet;
    a handle;
    a mirror;
    said formfitting phone case comprises a first planar portion, a second planar portion, a lateral portion, and a primary-access hole;
    said wallet comprises a foldable flap, a quick release fastener, and an pocket
    said handle comprises a first chain, a second chain, and a grasping member;
    said second planar portion comprises a top edge, a bottom edge, a left edge, and a right edge;
    said primary-access hole traversing through said first planar portion;
    said wallet being integrated onto said second planar portion;
    said handle being connected adjacent to said lateral portion;
    said mirror being mounted within said wallet;
    panel;
    said pocket panel being connected along said left edge, said bottom edge, and said right edge;
    said foldable flap being hingedly connected to said top edge;
    said foldable flap being detachably attached to said pocket panel by said quick release fastener;
    said grasping member being tethered to said lateral portion by said first chain;
    said grasping member being tethered to said lateral portion by said second chain; and
    said first chain and said second chain being positioned opposite of each other along said grasping member.

16. The protective carrying apparatus for a cellular phone and essential personal items as claimed in claim 15 comprises:
    said first planar portion being positioned adjacent and perpendicular to said lateral portion;
    said first planar portion being perimetrically connected to said lateral portion;
    said second planar portion being positioned adjacent and perpendicular to said lateral portion, opposite to said first planar portion; and
    said second planar portion being perimetrically connected to said lateral portion.

17. The protective carrying apparatus for a cellular phone and essential personal items as claimed in claim 15 comprises:
    said foldable flap comprises a tapered end;
    said quick release fastener comprises a first locking component and a second locking component;
    said tapered end being positioned opposite to said top edge across said foldable flap;
    said first locking component being integrated into said tapered end;
    said second locking component being positioned opposite to said bottom edge across said pocket panel;
    said second locking component being integrated into said pocket panel; and
    said first chain and said second chain being positioned adjacent to said foldable flap of said wallet.

18. The protective carrying apparatus for a cellular phone and essential personal items as claimed in claim 15 comprises:
    a embroidery pattern;
    said mirror being internally connected across said foldable flap; and
    said embroidery pattern being externally positioned across both said foldable flap and said pocket panel.

19. The protective carrying apparatus for a cellular phone and essential personal items as claimed in claim 15 comprises:
    a camera hole;
    said formfitting phone case further comprises a plurality of secondary-access holes;
    said camera hole traversing through said wallet and said second planar portion; and
    said plurality of secondary-access holes traversing through said lateral portion.

\* \* \* \* \*